Jan. 6, 1925.

H. C. ODENKIRK

DISK WHEEL FOR AUTOMOBILES

Filed June 5, 1924

1,522,259

Inventor
Harry C. Odenkirk,
By Jas. L. Skidmore
His Attorney.

Patented Jan. 6, 1925.  1,522,259

UNITED STATES PATENT OFFICE.

HARRY C. ODENKIRK, OF CLEVELAND, OHIO.

DISK WHEEL FOR AUTOMOBILES.

Application filed June 5, 1924. Serial No. 718,012.

*To all whom it may concern:*

Be it known that I, HARRY C. ODENKIRK, a citizen of the United States, residing at Cleveland, in the county of Cuyahoga and State of Ohio, have invented certain new and useful Improvements in Disk Wheels for Automobiles, of which the following is a specification.

This invention relates to a novel construction of wheel especially designed to be employed as a wheel for automobiles and motor vehicles, and more particularly to a wheel of what is known as the disk type.

The prime object of the invention is to provide a simple, strong, durable, economical and efficient wheel to be employed in connection with automobiles, said wheel being constructed of a minimum number of parts.

Another object of the invention is to provide a disk wheel comprising a solid pressed or stamped metal disk member, and another removable member formed of pressed or stamped metal, both of said members being rigidly secured together, with the peripheral portion of each member forming one-half of the rim of the wheel.

A further object of this invention is to so construct each member that they may be snugly and accurately fitted together, with one member forming a reliable and strong support for the other member, and secured together with a suitable number of securing bolts and nuts to form a completed wheel.

Further objects of the invention are to so construct my improved wheel that any one unskilled in the art may easily and quickly remove a punctured or worn tire and insert a new one; to form a solid steel wheel having an opening through the center thereof for the reception of the vehicle axle; to form an integral annular shoulder for the reception and support of a removable member, and to form the wheel from two sections or members, so constructed and rigidly secured together as to permit the use of a relatively inexpensive tubular member to form the hub and bearing portion of the wheel.

The foregoing and such other objects as may appear from the ensuing description are attained by the construction, arrangement, location and combination of the several parts hereinafter more fully described, illustrated by the accompanying drawings, and more particularly set forth in the claims appended hereto, it being understood that slight changes in the precise shape, proportions and minor details of the construction may be resorted to without departing from the spirit or sacrificing any of the advantages of the invention.

In the accompanying drawings forming a part of this specification it will be seen that:

Figure 2:
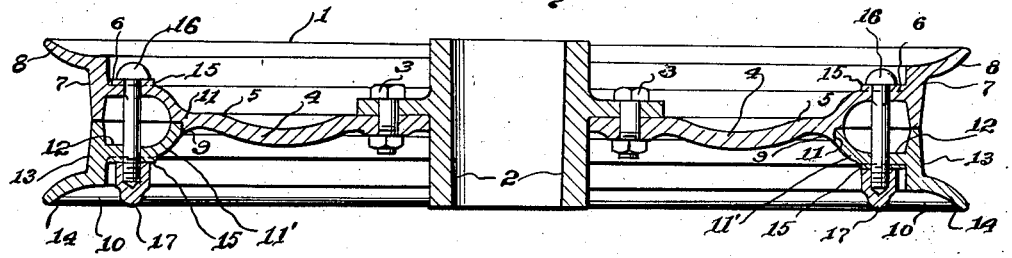
Figure 2 is a sectional elevation taken in the plane of the dotted lines 2—2, Figure 1.
Figure 1:
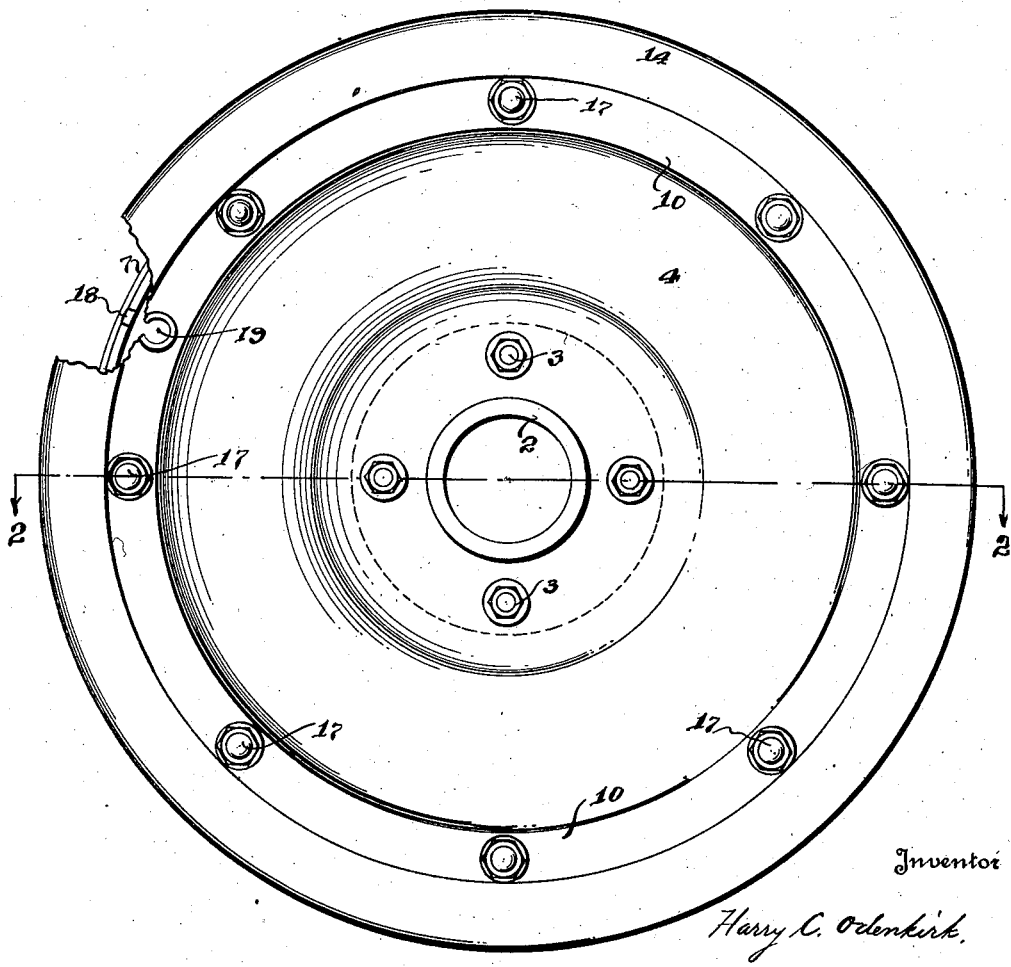
Figure 1 is a side elevation of the improved wheel embodying my invention.

In the embodiment of my invention as illustrated it will be seen that the numeral 1 designates the solid main section or member of the wheel, which may be formed of any suitable material, preferably of pressed steel, formed with a central opening therethrough for the reception of the tubular member 2 which forms the hub and bearing portion of the wheel, said tubular member being fixedly secured to the section or member 1 by any suitable or desirable fastening means, such as the bolts 3, as shown in Fig. 1. This member 1 is preferably formed with the intermediate dished-out portion 4, while its outer peripheral portion is flared upwardly and inwardly at 5 and merges into a straight portion 6, terminating with an integral right-angle portion 7, forming one-half of the rim of the wheel, said portion 7 being formed with an outwardly curved extension 8, and the outer face of said member 1 is recessed to form an annular shouldered portion 9 entirely around the member for the purpose hereinafter described.

The numeral 10 indicates a removable section or member also preferably formed from pressed steel provided with an annular shouldered portion 11 adapted to snugly engage with and rest upon the shoulder 9 of the member 1, said shouldered portion 11 flaring outwardly and upwardly at 11', merging into a straight portion 12, and terminating with the right-angle portion 13 forming the other half of the rim of the wheel, and having an outwardly curved extension 14, the two halves of the rim being adapted to contact with each other at the circumferential center of the wheel, while the straight portion of each section or members 1 and 10, are preferably provided with a reinforced portion 15, through which and the straight portion are formed any desirable number of openings for the reception of suitable securing bolts 16, to the threaded end of each bolt being fitted the hexagonal securing nuts 17, preferably formed with a closed outer surface such as clearly shown, whereby the sections 1 and 10 are fixedly and securely fastened together, thereby forming what may be properly termed a solid wheel of unusual strength and simplicity, and one in which the tires, normally clamped and fixedly secured between the curved extensions 8 and 14, may be easily and quickly renewed by simply releasing the securing nuts, leaving the bolts in their normal position, and lifting away the removable section 10, as will be readily understood.

The rim of the wheel is provided at any suitable point with an opening 18, such as shown in the broken away portion, Fig. 1, for the reception of the tire-inflating tube, which is preferably passed through an opening 19 formed through the removable section and is provided with the usual and well known closure (not shown).

It will be readily obvious that any desirable tire may be suitably secured upon the rim portion of the wheel between the extensions 8 and 14.

Having thus described my invention, what I claim and desire to secure by Letters Patent is:—

1. A wheel of the character described, comprising a disk member formed of solid, pressed steel with a central opening therethrough having an annular shouldered portion, an upwardly and outwardly flaring portion and a straight portion constituting one-half of the rim of the wheel, a removable member formed of pressed steel supported on said shouldered portion having an upwardly and inwardly flaring portion and a straight portion constituting the other half of the wheel rim.

2. A wheel of the character described, comprising a solid disk member formed of pressed steel having an annular shoulder formed in its inner face, an upwardly and outwardly flaring portion and a straight reinforced portion constituting one-half of the wheel rim, a removable member formed of pressed steel seated on said shoulder having an inwardly and upwardly flaring portion and a reinforced straight portion constituting the other half of the wheel rim, and means for removably and fixedly securing the said members together.

3. A wheel of the character described, comprising a solid disk formed with an intermediate dished portion and a central opening therethrough, an annular shoulder formed in its inner face, an outwardly and upwardly flaring portion and a straight portion constituting one-half of the wheel rim, a removable member seated upon said shoulder having an inwardly and upwardly flaring portion and a straight portion constituting the other half of the wheel rim, a series of bolts adapted to pass through said disk and member, and nuts fitted to said bolts whereby said disk and member are removably and securely fastened together.

HARRY C. ODENKIRK.